United States Patent
Suzuki et al.

(10) Patent No.: US 6,755,487 B2
(45) Date of Patent: Jun. 29, 2004

(54) BRAKE ADJUSTMENT METHOD AND APPARATUS THEREOF

(75) Inventors: Kazuyuki Suzuki, Hirakata (JP);
Shigeru Yamamoto, Hirakata (JP);
Tomohiro Nakagawa, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/002,184

(22) Filed: Dec. 5, 2001

(65) Prior Publication Data

US 2002/0074856 A1 Jun. 20, 2002

(30) Foreign Application Priority Data

Dec. 14, 2000 (JP) ......................................... 2000-380163

(51) Int. Cl.[7] ................................................. B60T 8/32
(52) U.S. Cl. ..................................... 303/121; 180/9.44
(58) Field of Search ........................ 303/121; 180/9.44, 180/9.1, 6.7; 701/83

(56) References Cited

U.S. PATENT DOCUMENTS

| | | | | |
|---|---|---|---|---|
| 3,620,319 A | * | 11/1971 | Waldemar Armasow et al. ........................ | 180/6.44 |
| 3,760,896 A | * | 9/1973 | Kawamura et al. .......... | 180/6.7 |
| 3,964,562 A | * | 6/1976 | Kawamura et al. .......... | 180/6.7 |
| 5,325,933 A | * | 7/1994 | Matsushita .................. | 180/6.7 |
| 5,669,678 A | * | 9/1997 | Stumpe et al. ............... | 303/155 |
| 5,732,378 A | * | 3/1998 | Eckert et al. ................. | 701/83 |
| 6,260,642 B1 | | 7/2001 | Yamamoto et al. .......... | 180/6.7 |

FOREIGN PATENT DOCUMENTS

| | | |
|---|---|---|
| JP | A-8-214676 | 8/1996 |
| JP | A-2000-177618 | 6/2000 |

* cited by examiner

Primary Examiner—Christopher P. Schwartz
Assistant Examiner—Devon Kramer
(74) Attorney, Agent, or Firm—Rader, Fishman & Grauer (57) ABSTRACT

A brake adjustment method and apparatus thereof are described which are capable of providing proper brake hydraulic pressure compensation without causing variations due to different adjusters and without lifting the vehicle. The apparatus comprises: (a) an adjustment mode setting device for setting an adjustment mode for adjusting brake hydraulic pressure to a proper value, while the vehicle is in its stopped state; (b) brake hydraulic pressure changing control for controlling the brake hydraulic pressure to gradually change when the adjustment mode has been set by the adjustment mode setting device; (c) vehicle travel start detector for detecting a start of traveling of the vehicle; (d) brake pressure command value detector for detecting a brake pressure command value at the start of traveling of the vehicle, if a start of vehicle traveling is detected by the vehicle travel start detector while the brake hydraulic pressure is gradually changed by the brake hydraulic pressure changing control; and (e) a brake hydraulic pressure correcting system for correcting the brake hydraulic pressure to a proper value, based on the brake pressure command value detected by the brake pressure command value detector.

9 Claims, 9 Drawing Sheets

BRAKE ADJUSTMENT METHOD AND APPARATUS THEREOF

TECHNICAL FIELD

The present invention relates to a brake adjustment method and apparatus thereof for making a steering brake adjustment to ensure proper steering brake performance in a tracklaying vehicle in which a right or left turn is made by controlling clutch hydraulic pressure and brake hydraulic pressure through operation of an electrical power-assisted steering lever.

BACKGROUND ART

In a known tracklaying vehicle such as bulldozers, the clutch and brake attached to each of the right and left drive wheels are controlled to effect right and left turns of the vehicle. More specifically, if the steering lever is operated in either the right or left steering direction during traveling of the vehicle, the clutch on the side toward which the steering lever has been operated is released from its engaged state, while the brake on the same side is actuated in the braking direction with the crawler belt only on this side being brought to a stop, so that the vehicle turns in the desired direction.

The so-called electronically controlled steering systems come into common use for providing clutch and brake control. Such a steering system includes (i) an electrical power-assisted steering lever, (ii) a steering command signal generator for issuing a steering command signal in accordance with the operating amount of the steering lever and (iii) an electronic proportional control valve controlled based on the output from the steering command signal generator, and controls the clutches and brakes through control of the electronic proportional control valve.

The electronically controlled steering systems present the bothersome drawback that if variations in vehicle performance occur owing to variations in the constituents (e.g., solenoids and springs) of the control valves or variations in the thickness of the clutch disks or brake disks, mechanical adjustments (e.g., shim adjustment and stroke adjustment) have to be carried out as required whenever they occur. These steering systems suffer from another problem that long use of the vehicle leads to wear etc. of the operation system including the steering brakes and steering clutches, resulting in degradation of vehicle performance.

For constantly providing desired proper steering brake or steering clutch performance to overcome the forgoing problems, it is necessary to incorporate a system which enables a brake or clutch adjustment at the time of delivery or check of a vehicle.

There is known a steering brake adjustment method carried out in the following procedure.

Step 1: A crawler belt is lifted from the ground by use of implements (blade and ripper) or jacks.

Step 2: Engine rotation is set to a low idling state.

Step 3: An adjustment mode is set.

Step 4: The crawler belt is rotated with the transmission placed in the third forward speed range (F3).

Step 5: The test starting switch is turned on. At that time, a test current flows to the brake solenoid for a specified period of time and after the elapse of the specified time, the speed of the crawler belt returns to a normal speed.

Step 6: The adjuster makes a check as to whether or not the crawler belt had stopped before the speed of the crawler belt returned to the normal speed. Then, if it is determined the crawler belt had stopped, the adjuster makes a check again with an increased setting of hydraulic pressure to determine whether the crawler belt stops.

Step 7: If the crawler belt did not stop before returning to the normal speed, the adjuster makes a check again with a decreased setting of hydraulic pressure to determine whether the crawler belt stops. Checks are made in this way and when the crawler belt has stopped, the adjustment mode is ended.

A prior art technique associated with the invention is disclosed in Japanese Patent Publication (KOKAI) Gazette No. 8-214676 (1996). This technique is associated with a steering brake pressure control system such as combines in which an adjustment for the interrelationship between the reference property values of steering brake pressure on the steering lever side and steering brake pressure on the pedal side is made such that the initial value of either one of the reference values is adjusted and altered, thereby automatically adjusting/altering the initial value of the other reference value.

The known adjustment method implemented through the above-described steps 1 to 7, however, has revealed the disadvantage that since brake hydraulic pressure is gradually decreased while a crawler belt being rotated with the vehicle lifted and an adjustment is made based on the instance of a stop of the crawler belt which has been confirmed by the adjuster by visual inspection of the movement of the crawler belt, the adjuster has to judge the switch point at which the kinematic friction is switched to static friction, which leads to considerable variations in detection properties. In addition, the interventional judgement by the adjuster would be accompanied with variations when different adjusters make the judgement. Finally, since the vehicle needs to be lifted during the adjustment, a jack is required for lifting it. Even if the vehicle is lifted by an implement attachable to the front or rear part of the vehicle, the adjustment has to be disadvantageously carried out with the implement mounted on the vehicle.

The prior art associated with the present invention, which is disclosed in Japanese Patent Publication No. 8-214676, is intended to provide control for interlinking the steering pressure adjustments on the steering lever side and on the pedal side, but principally differs from the subject of the invention which is primarily made for providing a steering brake adjustment method.

The invention is directed to overcoming the foregoing problems and a primary object of the invention is therefore to provide a brake adjustment method and apparatus thereof, which make it possible to readily and accurately provide proper brake hydraulic pressure compensation without variations due to different adjusters and without a need for lifting the vehicle.

DISCLOSURE OF THE INVENTION

The above object can be achieved by a brake adjustment method according to a first aspect of the invention. The method is adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the method being made such that when an adjustment mode is selected with the vehicle in its stopped state, a command value for the brake hydraulic pressure at the start of vehicle traveling is detected while the brake hydraulic pressure being gradually changed, and an adjustment for a brake is made based on the detected command value.

According to the invention, for brake adjustment, the adjustment mode is set with the vehicle in its stopped state and brake hydraulic pressure is gradually varied (e.g., increasing) during the adjustment mode. Then, a command value of brake hydraulic pressure at the start of vehicle traveling is detected and according to this command value, a brake adjustment is carried out. With this arrangement, variations due to different adjusters can be avoided, and variations in detection properties can be eliminated and an easy, accurate brake adjustment can be made thanks to the adjustment using the switch point, as the judgement basis, at which static friction is switched to kinematic friction. In addition, since there is no need to rotate the crawler belt with the vehicle lifted during the adjustment, a jack for lifting the vehicle is no longer required. Further, the adjustment operation can be carried out with no implements mounted on the vehicle. Finally, since it is not necessary to keep the brake in its sliding state for a long time, heat does not develop in the brake, which obviates the risk of adverse effects on the brake.

Figure 1:
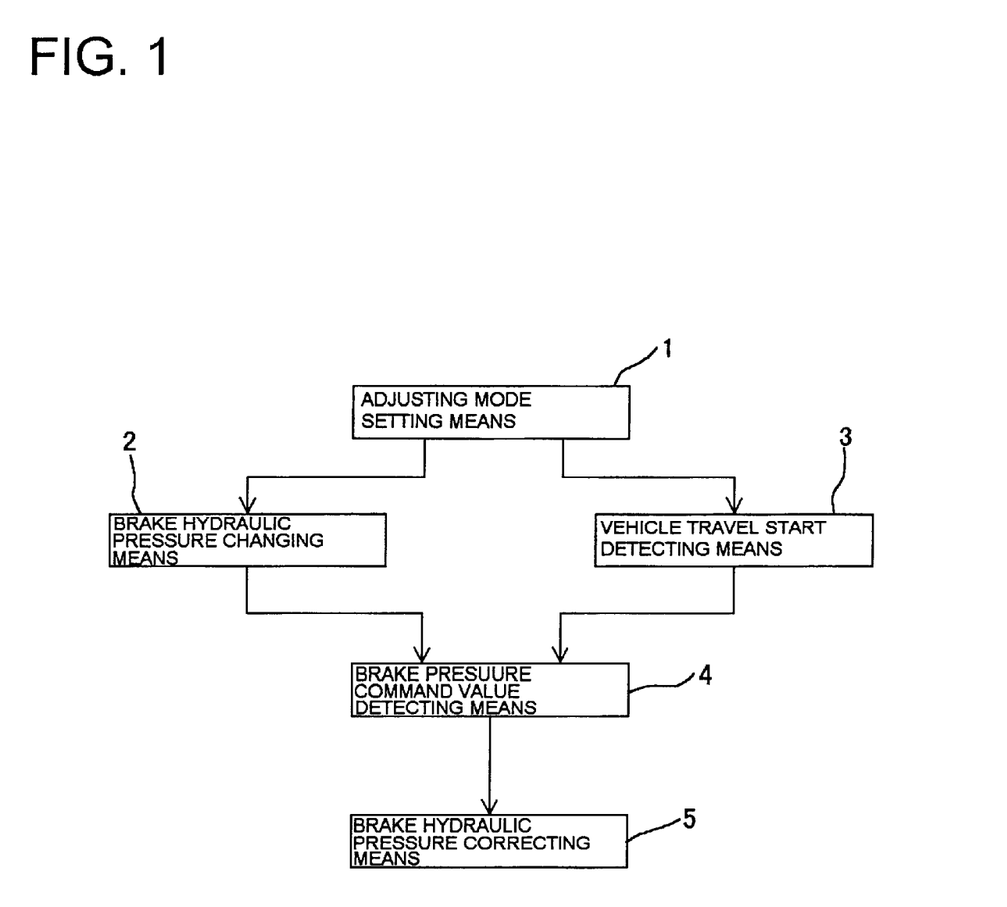
FIG. 1 is a general block diagram of a brake adjustment apparatus associated with the second aspect of the invention.

According to a second aspect of the invention, there is provided a brake adjustment apparatus adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the apparatus comprising, as shown in the general block diagram of FIG. 1, (a) adjustment mode setting means 1 for setting an adjustment mode for adjusting the brake hydraulic pressure to a proper value, while the vehicle being in its stopped state;

(b) brake hydraulic pressure changing means 2 for controlling the brake hydraulic pressure to gradually change when the adjustment mode has been set by the adjustment mode setting means 1;

(c) vehicle travel start detecting means 3 for detecting a start of traveling of the vehicle;

(d) brake pressure command value detecting means 4 for detecting a brake pressure command value at the start of traveling of the vehicle, if a start of vehicle traveling is detected by the vehicle travel start detecting means 3 while the brake hydraulic pressure being gradually changed by the brake hydraulic pressure changing means 2; and (e) brake hydraulic pressure correcting means 5 for correcting the brake hydraulic pressure to a proper value, based on the brake pressure command value detected by the brake pressure command value detecting means 4.

The second aspect of the invention is associated with an apparatus which implements the brake adjustment method of the first aspect. For starting brake adjustment, the adjustment mode is set by the adjustment mode setting means 1 while the vehicle is in its stopped state. In this adjustment mode, the brake hydraulic pressure is gradually changed (e.g., increasing) by the brake hydraulic pressure changing means 2. If a start of traveling of the vehicle is detected by the vehicle travel start detecting means 3 during the changing of the brake hydraulic pressure, a command value of brake hydraulic pressure at the start of traveling of the vehicle is detected by the brake pressure command value detecting means 4 and based on the detected command value, the brake hydraulic pressure correcting means 5 corrects the brake hydraulic pressure so as to have a proper value. This arrangement provides the same effect as in the first aspect of the invention and is particularly advantageous in that since the travel starting condition of the vehicle is automatically detected by the vehicle travel start detecting means 3, variations attributable to different adjusters can be avoided so that anybody can make an adjustment with ease.

Preferably, the apparatus of the second aspect of the invention is modified such that the adjustment mode setting means 1 can set the adjustment mode with at least one of the clutches, which is located on an adjusted side, being in its engaged condition at all times, and such that a transmission output-side rotation sensor for detecting the rotation of the output side of the transmission of the vehicle is used as the vehicle travel start detecting means 3. In such an adjustment mode, at least one of the clutches, which is located on an adjusted side, is in its engaged state at all times, and therefore, when the brake slips during the adjustment mode, in other words, when the vehicle starts traveling, the vehicle travels straight-ahead so that a safer brake adjustment can be effected. By use of a transmission output-side rotation sensor as the vehicle travel start detecting means 3, the sliding condition of the brake can be readily and accurately detected.

The second aspect is preferably modified such that the brake hydraulic pressure changing means 2 sets an initial value for the brake hydraulic pressure in accordance with a reference line representing reference brake pressure command values relative to the tractive force of the vehicle, the initial value being used as a basis for changing the brake hydraulic pressure. This makes it possible to determine a proper brake hydraulic pressure command value based on the tractive force so that a brake hydraulic pressure closer to the hydraulic pressure at the time of brake sliding can be effectively obtained, without being affected by variations in other parts (e.g., engine and power line) than the steering section.

It is preferable, in this case, that the brake hydraulic pressure changing means 2 controls the brake hydraulic pressure so as to increase step-wise by a specified amount at specified time intervals, starting from the above initial value. By virtue of this arrangement, the brake hydraulic pressure at the start of sliding of the brake can be readily and accurately obtained.

The apparatus according to the invention may be modified such that the brake hydraulic pressure correcting means 5 corrects the brake hydraulic pressure based on the difference between a reference brake pressure command value corresponding to a specified tractive force of the vehicle and the brake pressure command value detected by the brake pressure command value detecting means. This makes it possible to easily obtain a brake hydraulic pressure value to be corrected.

BEST MODE FOR CARRYING OUT THE INVENTION

Referring now to the accompanying drawings, a brake adjustment method and apparatus thereof will be described according to a preferred embodiment of the invention.

Figure 2:
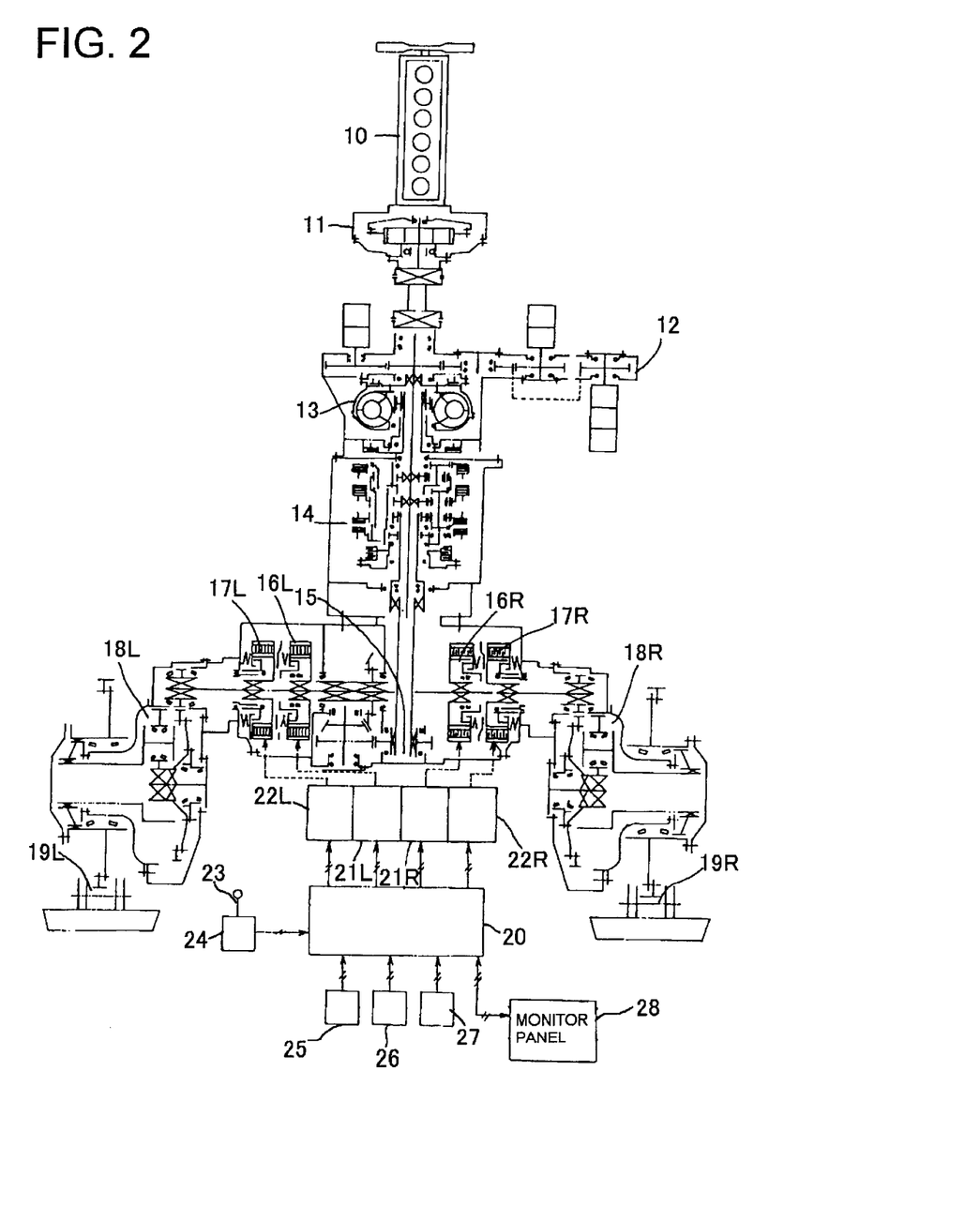
FIG. 2 is a system structural diagram of a brake adjustment apparatus according to one embodiment of the invention.

FIG. 2 shows a system structural diagram of a brake adjustment apparatus constructed according to one embodiment of the invention. The apparatus of this embodiment is one applied to a bulldozer.

In the bulldozer according to the present embodiment, a rotative driving force from an engine 10 is transmitted to a torque converter 13 through a damper 11 and a PTO 12 and then transmitted from the output shaft of the torque converter 13 to a transmission 14 which is, for example, a planetary gear wet-type multi-plate clutch transmission having an input shaft coupled to the output shaft of the torque converter 13. This transmission 14 includes a forward drive clutch, a reverse drive clutch, and first to third speed clutches. The rotative driving force from the output shaft of the transmission 14 is transmitted to a right and left pair of final reduction gears 18R, 18L through a transfer 15, right and left steering clutches 16R, 16L and right and left brakes 17R, 17L, whereby sprockets 19R, 19L for running crawler belts (not shown) are driven.

The clutches 16R, 16L and the brakes 17R, 17L are designed to be actuated by the energizing force of springs and released by hydraulic pressure, and controlled by a right clutch solenoid proportional control valve 21R, a left clutch solenoid proportional control valve 21L, a right brake solenoid proportional control valve 22R and a left brake solenoid proportional control valve 22L, respectively, in response to a control signal output from a controller 20.

Input to the controller 20 is a signal from a steering command signal generator 24 which issues a steering command signal according to the operation amount of a steering lever (mono lever) 23. This steering lever 23 also serves as a gear shift lever for forward and backward drives. Apart from the signal from the generator 24, the controller 20 inputs other data such as rotational speed data on the engine 10 from an engine rotation sensor 25; rotational speed data on the output shaft of the transmission 14 from a transmission output shaft rotation sensor 26 (which corresponds to the transmission output-side rotation sensor of the present invention); and data on the speed range state of the transmission 14 from a transmission speed range sensor 27. Connected to the controller 20 is a touch-panel-type monitor panel 28 serving as a display device for showing data to the operator.

Figure 3:
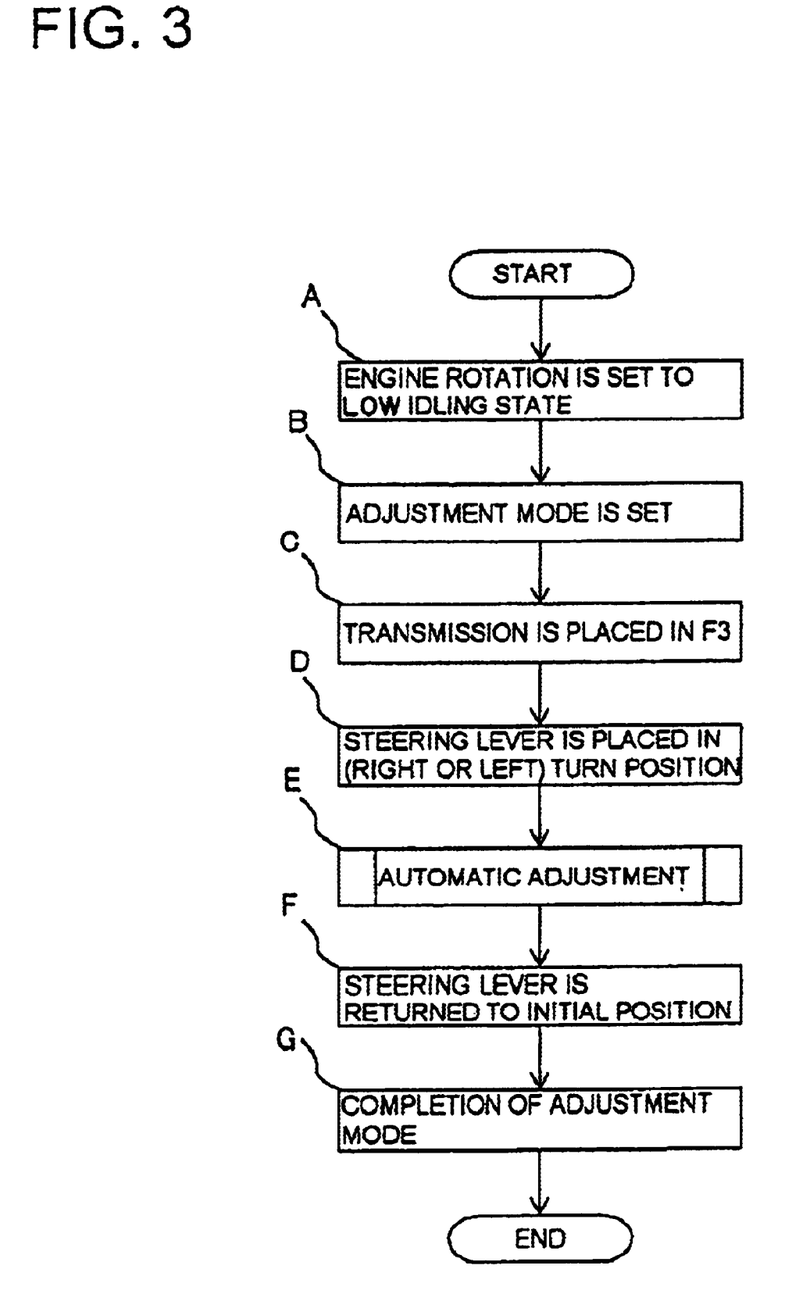
FIG. 3 is a flow chart of a process of adjusting a brake.

Reference is made to the flow chart of FIG. 3 to describe a process for brake adjustment according to the present embodiment.

Step A: For making a brake adjustment, the engine 10 is first started with the rotational speed of the engine 10 set to a low idling state, while the right and left clutches 16R, 16L being engaged, in other words, while control signals to be sent to the right and left clutch solenoid proportional control valves 21R, 21L being cut off.

Step B: Then, the adjustment mode is set (selected). A concrete setting process for the adjustment mode will be described later.

Step C: The transmission 14 is placed in the forward third speed range (F3).

Step D: The steering lever 23 is shifted in a turning direction (right or left) to the side at which a brake adjustment is to be carried out. At that time, a command signal for instructing automatic brake adjustment is generated to be input to the controller 20.

Step E: An automatic adjustment for the brake is carried out by the controller 20. This automatic adjustment will be described later in detail with reference to the flow chart of FIG. 4.

Step F: After completion of the automatic adjustment, a caution buzzer buzzes to inform the adjuster of the completion of the adjustment. Upon receipt of the information, the adjuster puts the steering lever 23 back to the initial neutral position. It should be noted that if an adjustment for the right brake has been carried out by shifting the steering lever 23 to the right hand, the steering lever 23 is then shifted to the left thereby to make an adjustment for the left brake.

Step G: The adjustment mode is completed.

Figure 4:
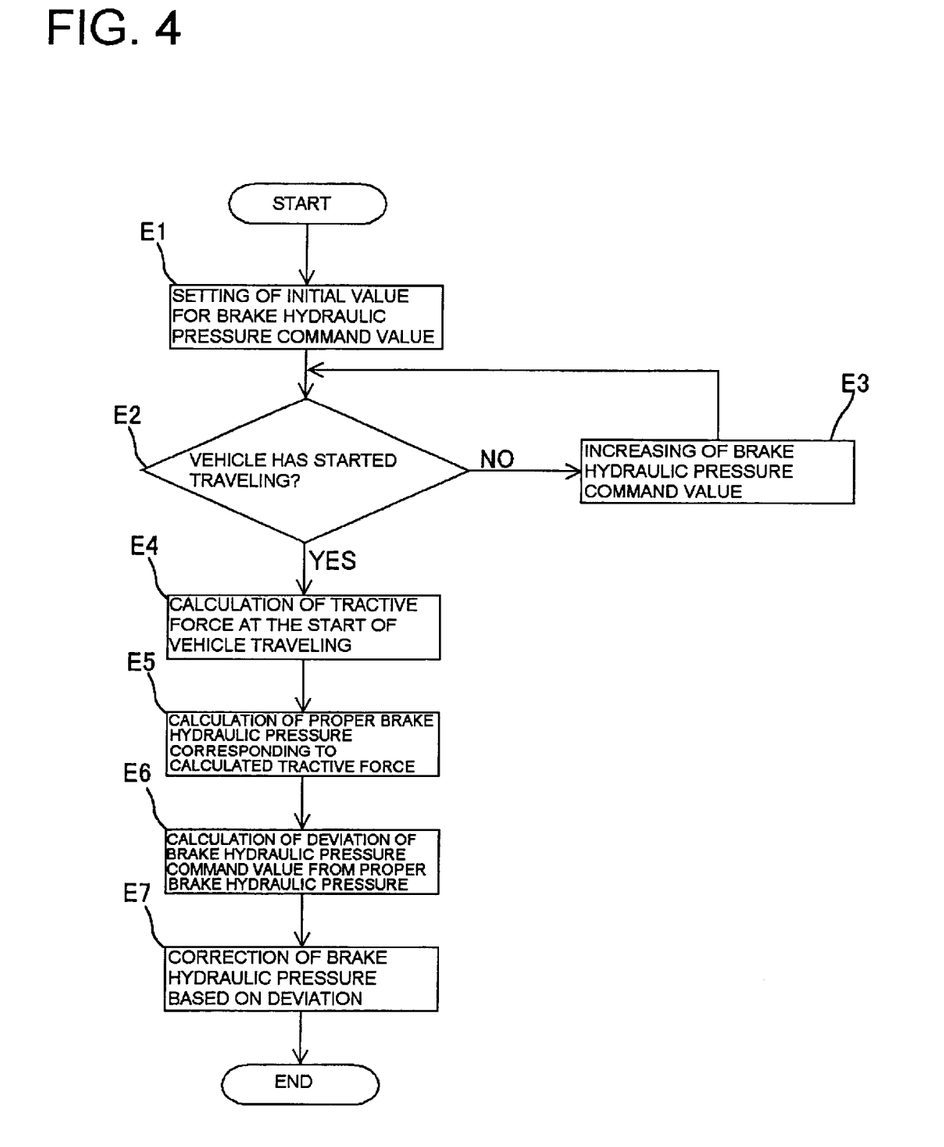
FIG. 4 is a flow chart of a control process for automatic adjustment.

Next, the control process for the automatic adjustment mentioned at Step E will be described with reference to the flow chart of FIG. 4.

Step E1: An initial command value of brake hydraulic pressure is set. As this initial setting, a preset value which is lower than a proper brake hydraulic pressure (described later) is used.

Step E2: A check is made to determine whether or not the vehicle has started traveling by judging if an input signal from the transmission output shaft rotation sensor 26 becomes equal to or more than a specified threshold value. If a start of traveling of the vehicle is detected, the program then proceeds to Step E4 and if a start of traveling is undetected on the other hand, the program proceeds to Step E3.

Figure 5:
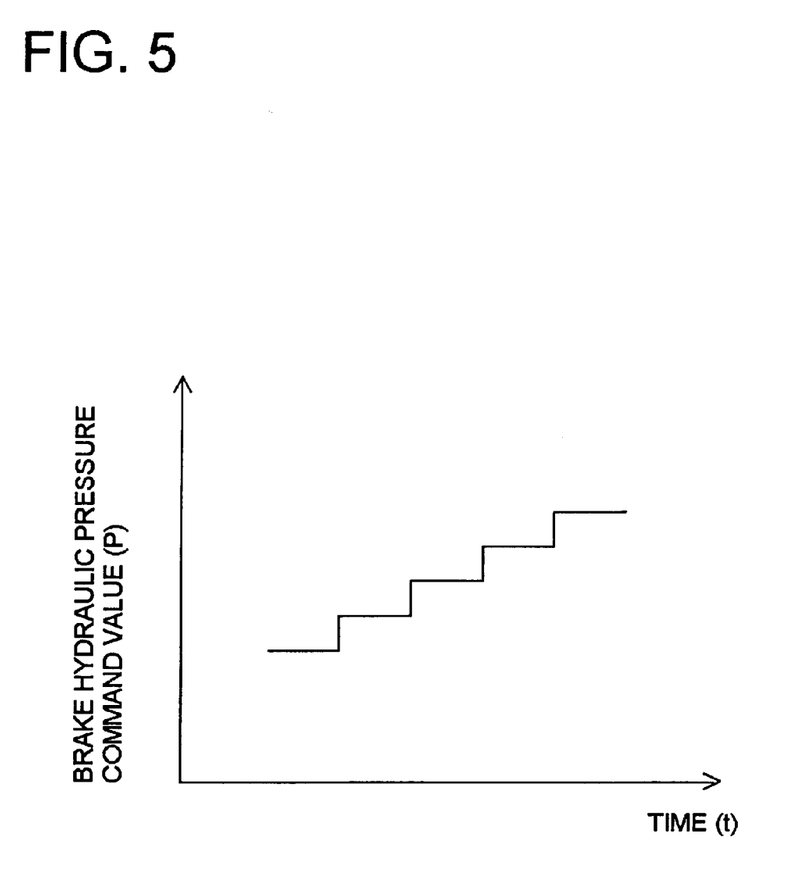
FIG. 5 is a graph of changes in the command value of brake hydraulic pressure.

Step E3: The brake hydraulic pressure command value is increased. In this case, a brake hydraulic pressure command value, which is step-wise increased at specified time intervals as shown in FIG. 5, is used. After increasing the brake hydraulic pressure command value, it is determined again in Step E2 whether the vehicle has started traveling.

Step E4: If the vehicle has started traveling, the tractive force F of the vehicle at the start of vehicle traveling is calculated. This tractive force F is obtained in such a way that engine torque is obtained from rotational speed data on the engine 10 sent from the engine rotation sensor 25 and this engine torque is multiplied by the reduction ratio between the speed of the output shaft of the torque converter 13 and that of the sprocket 19R or 19L and further multiplied by the diameter of the sprocket 19R or 19L.

Figure 6:
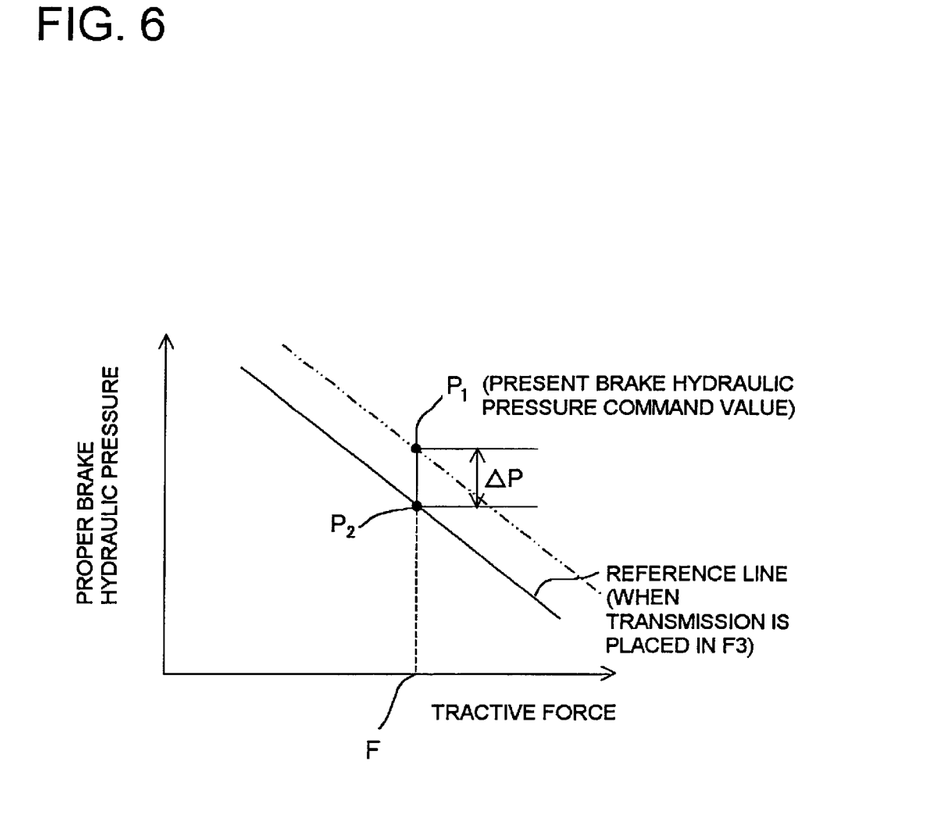
FIG. 6 is a graph showing the relationship between proper brake hydraulic pressure and tractive force.

Step E5: A reference line of proper brake hydraulic pressure characteristics for tractive force (when the transmission is placed in F3) as indicated by solid line of FIG. 6 is stored in the controller 20 beforehand. Based on this reference line, a proper brake hydraulic pressure $P_2$ for the tractive force F is calculated, using the tractive force F obtained at the preceding step.

Step E6: Calculation is done to obtain the deviation ΔP of a brake hydraulic pressure command value (commanded brake hydraulic pressure) $P_1$ at the start of vehicle traveling from the proper brake hydraulic pressure obtained at the preceding step.

Step E7: The deviation $\Delta P$ thus obtained is stored in the controller 20 and the reference line is corrected based on the value $\Delta P$, thereby obtaining the line indicated by two-dot chain line of FIG. 6. Upon completion of the adjustment, the caution buzzer buzzes to inform the adjuster of the completion of the adjustment.

The brake hydraulic pressure deviation to be compensated for ($\Delta P$) can be thus easily obtained, and with this value, the brake hydraulic pressure is automatically corrected so that an accurate brake adjustment can be easily and reliably carried out without causing variations due to different adjusters. According to the adjustment method of the present embodiment, since a switch point at which static friction is switched to kinematic friction is used as the basis for the judgement, the adjustment method has the advantage that no variations occur in detection properties. Further, there is no need to lift the vehicle for allowing rotation of the crawler belt during adjustment, and the adjustment operation can be carried out without the implements being mounted on the vehicle. In addition, since the brake is not kept in its sliding state for a long time, heat does not develop in the brake, which obviates the risk of adverse effects on the brake.

Figure 7:
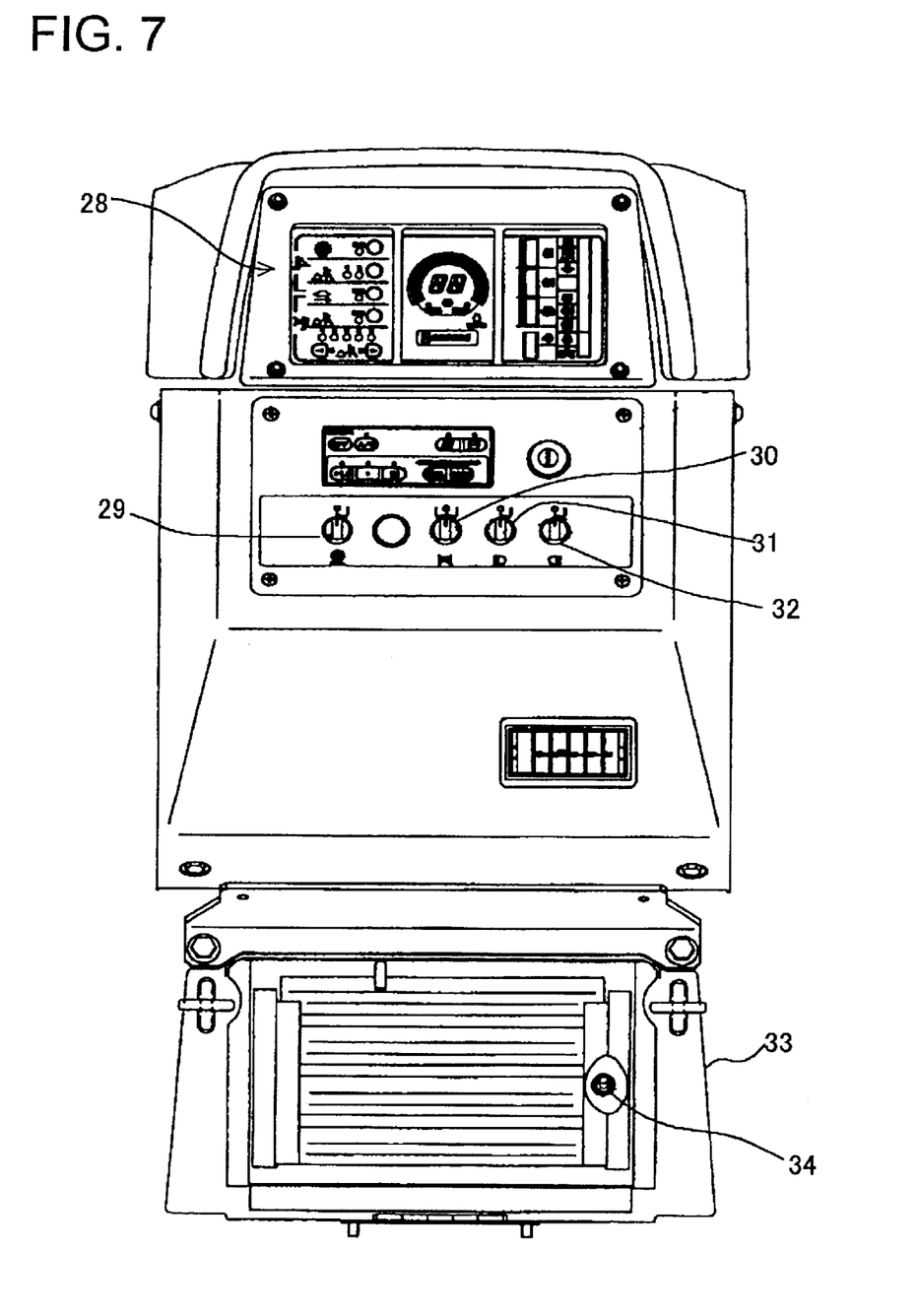
FIG. 7 shows a monitor panel and a wire diagram for switches, installed in a cab.
Figure 8:
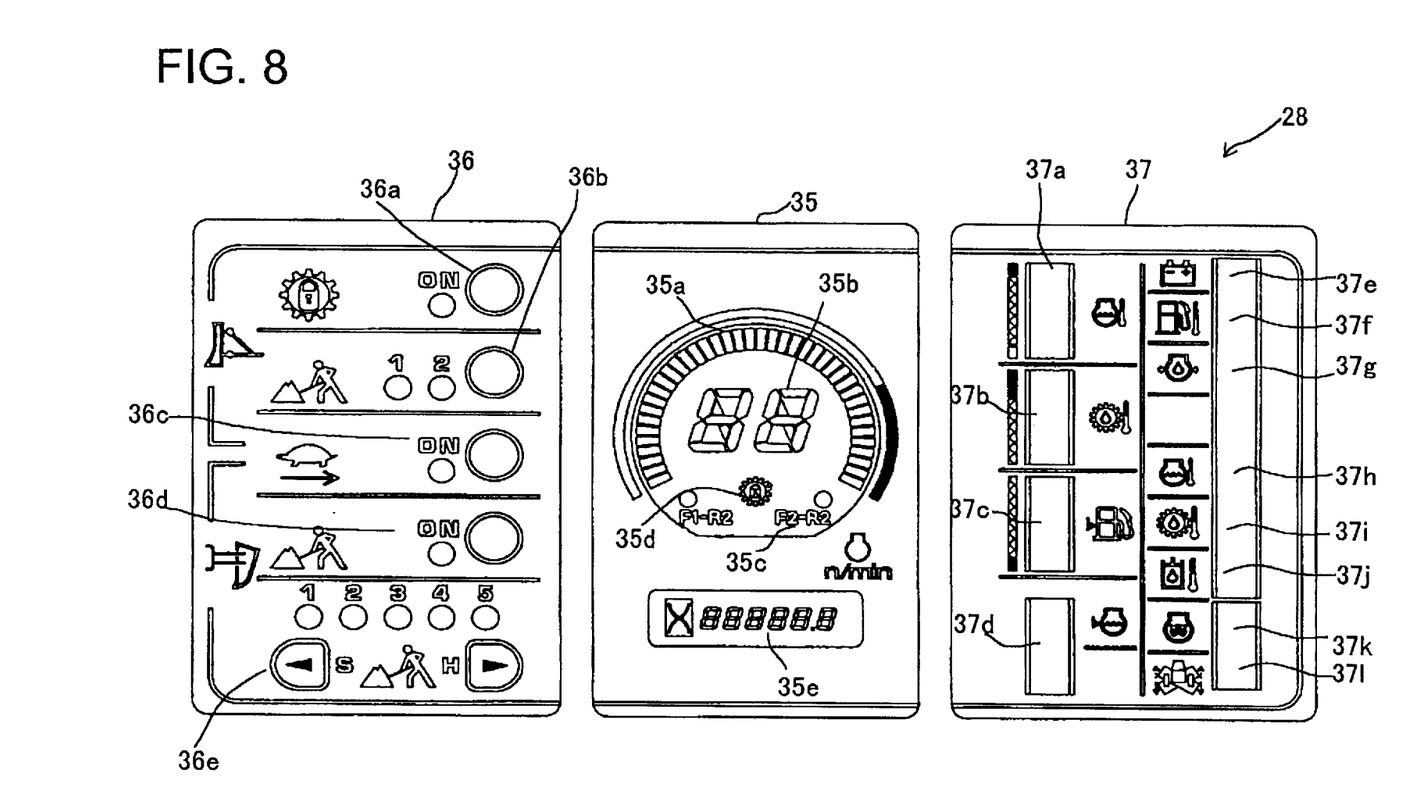
FIG. 8 is a detailed view of the monitor panel.

Next, the aforementioned setting process for the adjustment mode (see Step B in FIG. 3) will be more concretely described. FIG. 7 shows a monitor panel and wire diagram for switches, installed in the cab of the bulldozer constructed according to the present embodiment. FIG. 8 shows a detailed view of the monitor panel.

As seen from FIG. 7, the touch-panel-type monitor panel 28 is installed in the front part of the cab, and various switches such as an automatic shift down switch 29, a buzzer canceling switch 30, a headlight switch 31, and a taillight switch 32 are provided under the monitor panel 28. Disposed under these switches is a service switch 34 which is located at such a position that an ordinary operator cannot operate the switch, that is, a position inside a cover 33 to which only an adjuster has access.

As shown in FIG. 8, the monitor panel 28 has a tacho module 35 at its center, a shoe slip control switch module 36 at the left hand, and a caution module 37 at the right hand. The tacho module 35 is comprised of a tachometer 35a, a speed range display 35b, a travel mode display 35c, a lock-up display 35d and a service meter 35e. The shoe slip control switch module 36 is composed of a lock-up switch 36a, an economy switch 36b, a backward drive slow switch 36c, a shoe slip control switch 36d, and a shoe slip mode switch 36e. The caution module 37 is composed of (i) gauges such as an engine water temperature gauge 37a, a power line oil temperature gauge 37b and a fuel gauge 37c; (ii) caution displays such as a radiator water level display 37d, a charged current amount display 37e, a fuel temperature display 37f, an engine hydraulic pressure display 37g, an engine water temperature display 37h, a power line oil temperature display 37i and a hydraulic fluid temperature display 37j; and (iii) lamps such as a glow lamp 37k and a dual tilt 37l.

Figure 9:
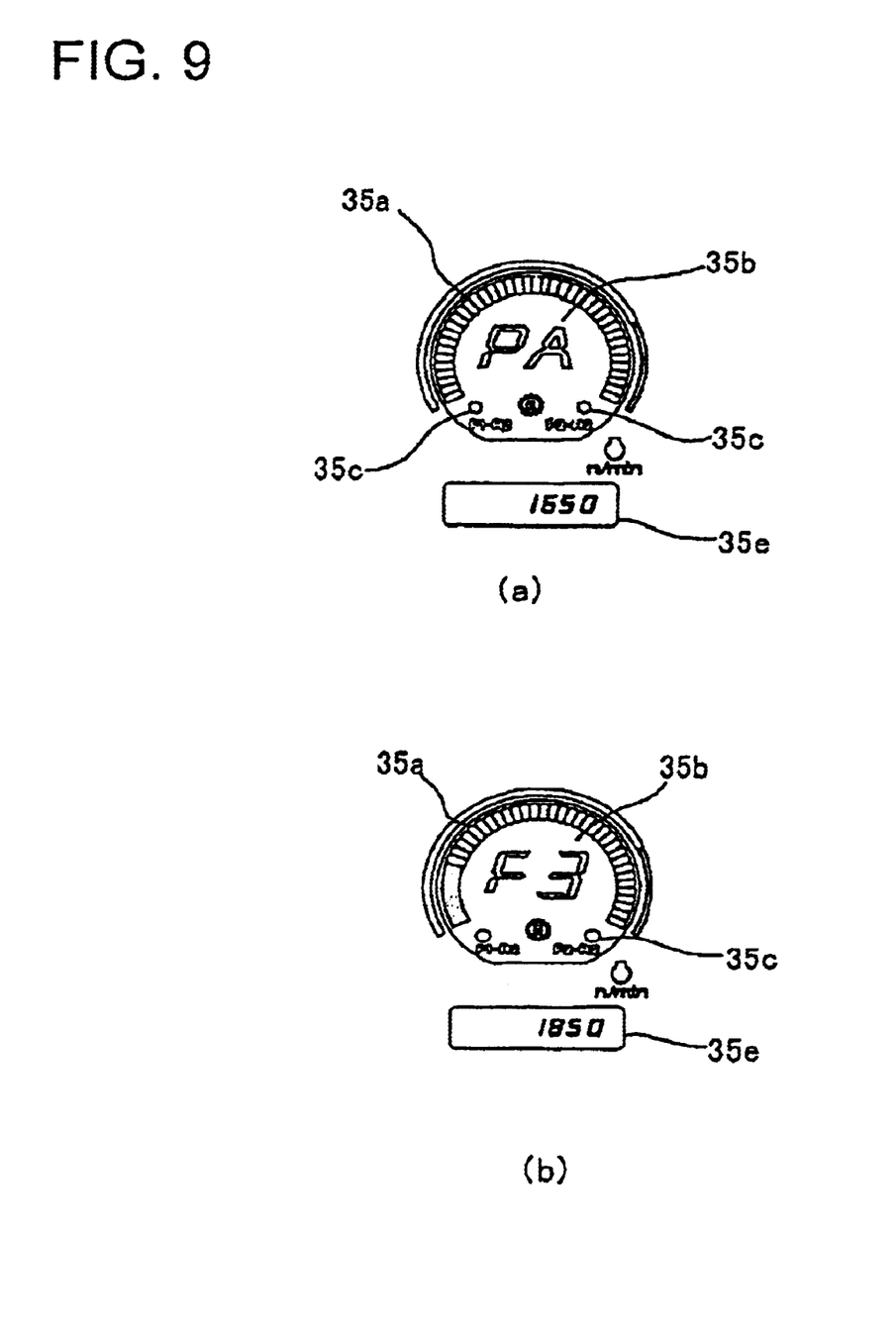
FIGS. 9(a) and 9(b) are views each illustrating a presentation displayed in an adjustment mode.

In this arrangement, when a normal operation is carried out (i.e., when a normal mode is selected), tacho gauge displaying is done by the tachometer 35a of the tacho module 35 provided in the monitor panel 28, the current speed range (F1, F2, etc.) is displayed in characters on the speed range display 35b, and service time is displayed in figures on the service meter 35e. In this condition, the adjuster turns on both the buzzer canceling switch 30 and the service switch 34 to select service modes. When a brake adjustment mode, which is one of the service modes, has been set, the speed range display 35b is switched to its character displaying state to display "PA" as shown in FIG. 9(a), which indicates the brake adjustment mode, while the travel mode display 35c is switched to its lighting state, indicating the adjustment mode. Further, the service meter 35e is switched to its figure displaying state to indicate a brake hydraulic pressure command value (in the example shown in FIG. 9(a), the brake hydraulic pressure command value indicated by the service meter 35e is 16.50 kg/cm$^2$).

Upon shifting of the speed range of the transmission 14 into the forward third speed (F3) (Step C of FIG. 3) after setting the adjustment mode, the speed range display 35b is switched from "PA" to "F3" as shown in FIG. 9(b) with the tacho gauge displayed on the tachometer 35a increasing with time during the adjustment while the brake hydraulic pressure command value displayed on the service meter 35e automatically changing.

According to the present embodiment, the operations at Steps C and D are effected by the adjuster in the brake adjustment process shown in FIG. 3. An alternative is possible in which these operations are automatically carried out by transmitting a control signal from the controller 20 to the right and left brake solenoid proportional control valves 22R, 22L in response to an adjustment mode setting signal.

While the present embodiment uses the transmission output shaft rotation sensor 26 as the transmission output-side rotation sensor for detecting whether or not the vehicle has started traveling, a bevel rotation sensor for the lateral shaft may be used as the transmission output-side rotation sensor. In some cases, the adjuster may check the operation of the crawler belt by visual inspection.

While the brake hydraulic pressure command value in the present embodiment is step-wise increased as shown in FIG. 5, the brake hydraulic pressure command value may be continuously altered.

What is claimed is:

1. A brake adjustment method adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the method comprising the steps of:

selecting an adjustment mode with the vehicle in its stopped state and with a crawler belt of the vehicle in contact with the ground;

detecting a command value for the brake hydraulic pressure at the start of vehicle traveling with the crawler belt in contact with the ground while the brake hydraulic pressure is gradually changed; and adjusting a brake based on the detected command value while the crawler belt remains in contact with the ground.

2. A brake adjustment apparatus adapted for use with a tracklaying vehicle wherein right and left drive wheels are each provided with a clutch and a brake and wherein clutch hydraulic pressure and brake hydraulic pressure are controlled by operation of an electrical power-assisted steering lever to allow a right or left turn of the vehicle, the apparatus comprising:

(a) adjustment mode setting means for setting an adjustment mode for adjusting the brake hydraulic pressure to a proper value, while the vehicle being in its stopped state;

(b) brake hydraulic pressure changing means for controlling the brake hydraulic pressure to gradually change when the adjustment mode has been set by the adjustment mode setting means;

(c) vehicle travel start detecting means for detecting a start of traveling of the vehicle;

(d) brake pressure command value detecting means for detecting a brake pressure command value at the start of traveling of the vehicle, if a start of vehicle traveling is detected by the vehicle travel start detecting means while the brake hydraulic pressure being gradually changed by the brake hydraulic pressure changing means; and (e) brake hydraulic pressure correcting means for correcting the brake hydraulic pressure to a proper value, based on the brake pressure command value detected by the brake pressure command value detecting means.

3. A brake adjustment apparatus according to claim 2, wherein the brake hydraulic pressure correcting means corrects the brake hydraulic pressure based on the difference between a reference brake pressure command value corresponding to a specified tractive force of the vehicle and the brake pressure command value detected by the brake pressure command value detecting means.

4. A brake adjustment apparatus according to claim 2, wherein the adjustment mode setting means can set the adjustment mode with at least one of the clutches, which is located on an adjusted side, being in its engaged condition at all times, and wherein a transmission output-side rotation sensor for detecting the rotation of the output side of a transmission of the vehicle is used as the vehicle travel start detecting means.

5. A brake adjustment apparatus according to claim 4, wherein the brake hydraulic pressure correcting means corrects the brake hydraulic pressure based on the difference between a reference brake pressure command value corresponding to a specified tractive force of the vehicle and the brake pressure command value detected by the brake pressure command value detecting means.

6. A brake adjustment apparatus according to claim 2, wherein the brake hydraulic pressure changing means sets an initial value for the brake hydraulic pressure in accordance with a reference line representing reference brake pressure command values relative to the tractive force of the vehicle, the initial value being used as a basis for changing the brake hydraulic pressure.

7. A brake adjustment apparatus according to claim 6, wherein the brake hydraulic pressure correcting means corrects the brake hydraulic pressure based on the difference between a reference brake pressure command value corresponding to a specified tractive force of the vehicle and the brake pressure command value detected by the brake pressure command value detecting means.

8. A brake adjustment apparatus according to claim 6, wherein the brake hydraulic pressure changing means controls the brake hydraulic pressure so as to increase step-wise by a specified amount at specified time intervals, starting from said initial value.

9. A brake adjustment apparatus according to claim 8, wherein the brake hydraulic pressure correcting means corrects the brake hydraulic pressure based on the difference between a reference brake pressure command value corresponding to a specified tractive force of the vehicle and the brake pressure command value detected by the brake pressure command value detecting means.

* * * * *